United States Patent
Witczak et al.

[11] Patent Number: 6,062,912
[45] Date of Patent: May 16, 2000

[54] ANTENNA COUPLING SYSTEM

[75] Inventors: Mark F. Witczak, Oakwood Hills; Mark A. Chesney, Evanston, both of Ill.; Michael L. Naughton, Burlington, Wis.; Matthew Ronald Michieli, Gilbert; Charles Glen Smith, Jr., Scottsdale, both of Ariz.

[73] Assignee: Motorola, Inc., Schaumburg, Ill.

[21] Appl. No.: 09/080,613

[22] Filed: May 18, 1998

[51] Int. Cl.[7] .................................................. H01R 13/64
[52] U.S. Cl. ........................................... 439/680; 439/578
[58] Field of Search ................................... 439/680, 681, 439/675, 63, 916, 578, 582, 5, 854, 855, 859; 343/906

[56] References Cited

U.S. PATENT DOCUMENTS

| | | | |
|---|---|---|---|
| 4,074,271 | 2/1978 | Sakuma | 343/882 |
| 5,271,684 | 12/1993 | Phillips . | |
| 5,395,246 | 3/1995 | Punako et al. | 439/680 |
| 5,559,522 | 9/1996 | Seitz | 434/702 |
| 5,613,224 | 3/1997 | Auvray . | |
| 5,714,963 | 2/1998 | Cox | 343/772 |
| 5,769,652 | 6/1998 | Wider | 439/248 |
| 5,772,470 | 6/1998 | Togashi | 439/582 |
| 5,835,064 | 11/1998 | Gomez et al. | 343/702 |

FOREIGN PATENT DOCUMENTS

| | | |
|---|---|---|
| 0586896 | 3/1994 | European Pat. Off. . |
| 0694985 | 1/1996 | European Pat. Off. . |
| 0800226 | 10/1997 | European Pat. Off. . |
| 5-327328 | 12/1993 | Japan . |
| WO 97/12416 | 4/1997 | WIPO . |

*Primary Examiner*—Lincoln Donovan
*Attorney, Agent, or Firm*—Lalita P. Williams

[57] ABSTRACT

An antenna coupling system including an antenna stem (108) with a raised wall (206) having an opening (210) therethrough and defining a plurality of key receptacles (216, 218, 220, 222) and detents (224, 410, 412) coupled to an antenna latch detent mechanism (102) that provides a manner of maintaining a SSU antenna (106) in a stowed position and two deployed positions with respect to the SSU handset (100). The antenna coupling system further includes an antenna connector (110) and a handset connector (104) wherein rotation of the antenna connector (110) with respect to the handset connector (104) maintains a robust RF connection and notifies circuitry in the handset (100) when the antenna (106) is in one of two deployed positions.

2 Claims, 10 Drawing Sheets

ANTENNA COUPLING SYSTEM

FIELD OF THE INVENTION

The present invention relates to systems for making rotatable connections in a radiotelephone system. Although, the invention is subject to a wide range of applications, it is especially suited for use in a satellite radio communications system and will be particularly described in that connection.

BACKGROUND OF THE INVENTION

A cellular radiotelephone system consists of a number of base stations and radiotelephone handsets. The user receives and places radiotelephone calls through the handset, which is in radio communication with one of the base stations.

A satellite radio communications system, such as the IRIDIUM® system, has a network of satellites in a low earth polar orbit, each satellite performing the same function as a base station. The satellites transmit and receive signals from a satellite subscriber unit (SSU) to form a radiotelephone system, allowing users to place radiotelephone calls from anywhere in the world to anywhere else in the world.

Unlike cellular systems, the satellites do not remain in the same place with respect to the surface of the earth. Since the satellite could be anywhere in the hemisphere above the user, the SSU's antenna needs to have a gain pattern that covers the hemisphere above the user. Thus, designers have developed an antenna with a hemispherical gain pattern.

In order for an SSU to communicate with any of the possible low earth orbit satellites, the SSU's antenna needs to be oriented in a vertical position with respect to the ground. This orientation must be maintained regardless of whether the user is holding the SSU in his or her right or left hand.

U.S. Pat. No. 5,559,522 describes an antenna positioning apparatus capable of substantially vertical orientation of a radiotelephone antenna with respect to the ground. Although, the antenna positioning system described can be useful in some radiotelephone configurations, it may not operate properly in all, such as configurations wherein the antenna does not include a wedge shaped mating surface. Thus, there is a need for an alternative antenna coupling system that maintains the antenna in a vertical position with respect to the ground when an SSU is transmitting or receiving. Because signals transmitted between a satellite and a SSU have to travel farther distances than signals in a cellular system, there is an additional need for an antenna coupling system that provides a robust RF connection as the SSU's antenna is rotated to an active position with respect to the SSU's handset.

BRIEF DESCRIPTION OR THE DRAWINGS

SUMMARY OF THE PREFERRED EMBODIMENT

In a first aspect of the present invention, the antenna coupling system includes an antenna stem having a base and a first raised wall having an opening therethrough, the first raised wall coupled to the base and having an inner surface and an outer surface wherein the outer surface defines a plurality of key receptacles and a plurality of detents. In a second aspect of the present invention the antenna coupling system further includes an antenna connector disposed in the opening of the raised wall, the antenna connector including an outer conductor; a dielectric disposed in the outer conductor; and a center conductor disposed in the dielectric, wherein the outer conductor, dielectric and center conductor are concentric with one another.

In a third aspect of the present invention, the antenna coupling system includes an antenna stem having a base and a first raised wall having an opening therethrough, the first raised wall coupled to the base and having an inner surface and an outer surface wherein the outer surface defines a plurality of key receptacles and a plurality of detents, and wherein the first raised wall mates with an antenna latch detent mechanism.

DESCRIPTION OF THE PREFERRED EMBODIMENT

The following detailed description is exemplary and explanatory only and is not restrictive of the invention as claimed. The accompanying drawings illustrate the preferred embodiment of the invention and together with the description serve to explain the principles of the invention. Reference will now be made in detail to the present preferred embodiment of the invention.

Figure 1:
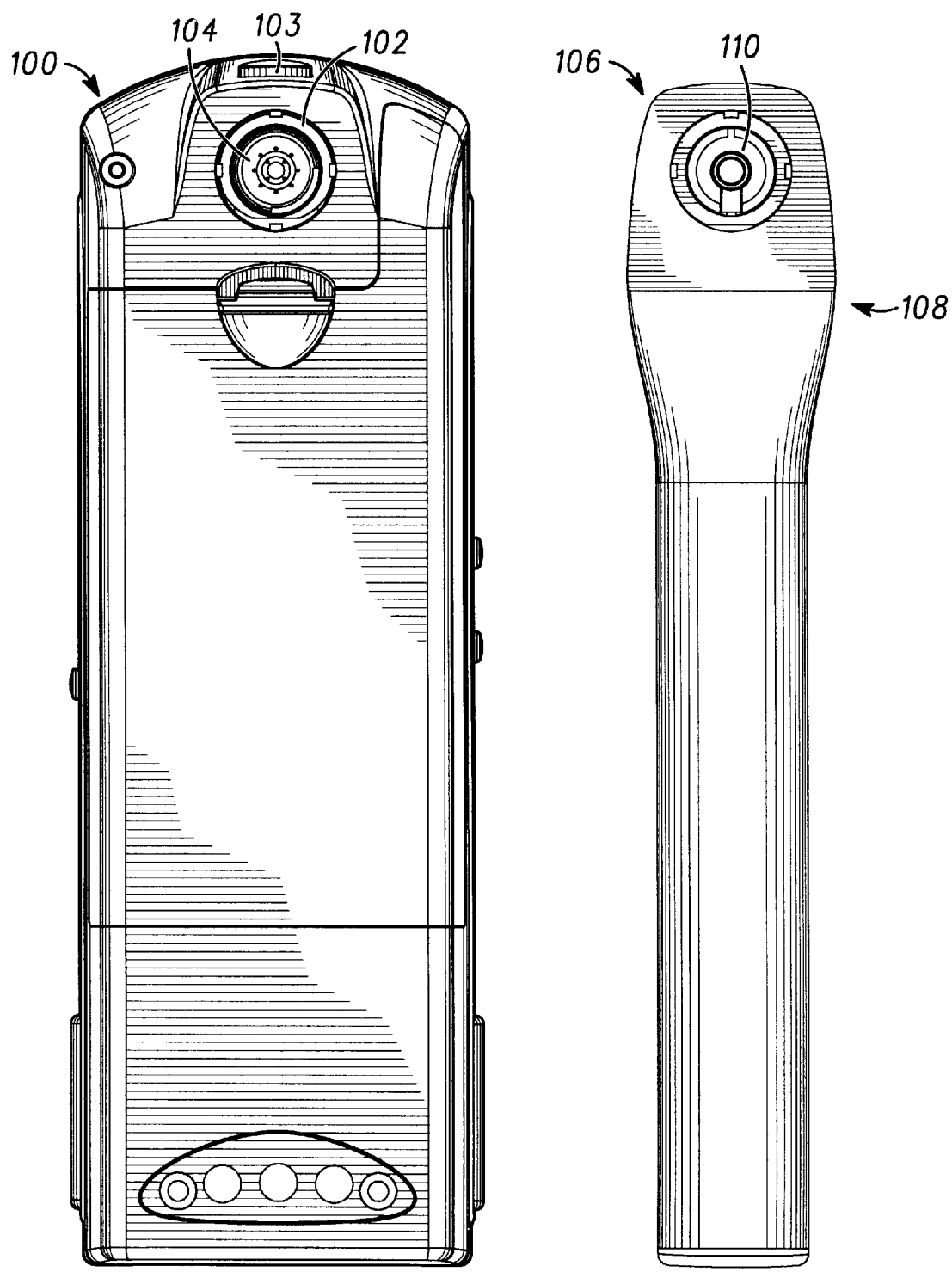
FIG. 1 is a rear view of a SSU handset and SSU antenna that embodies the present invention.

FIG. 1 shows a rear view of an SSU handset 100 and an SSU antenna 106 that can implement the antenna coupling system of the present invention. The antenna coupling system can include an antenna stem 108 (only part of the antenna stem 108 is shown), an antenna connector 110, an antenna latch detent mechanism 102 and a handset connector 104.

Figure 2:
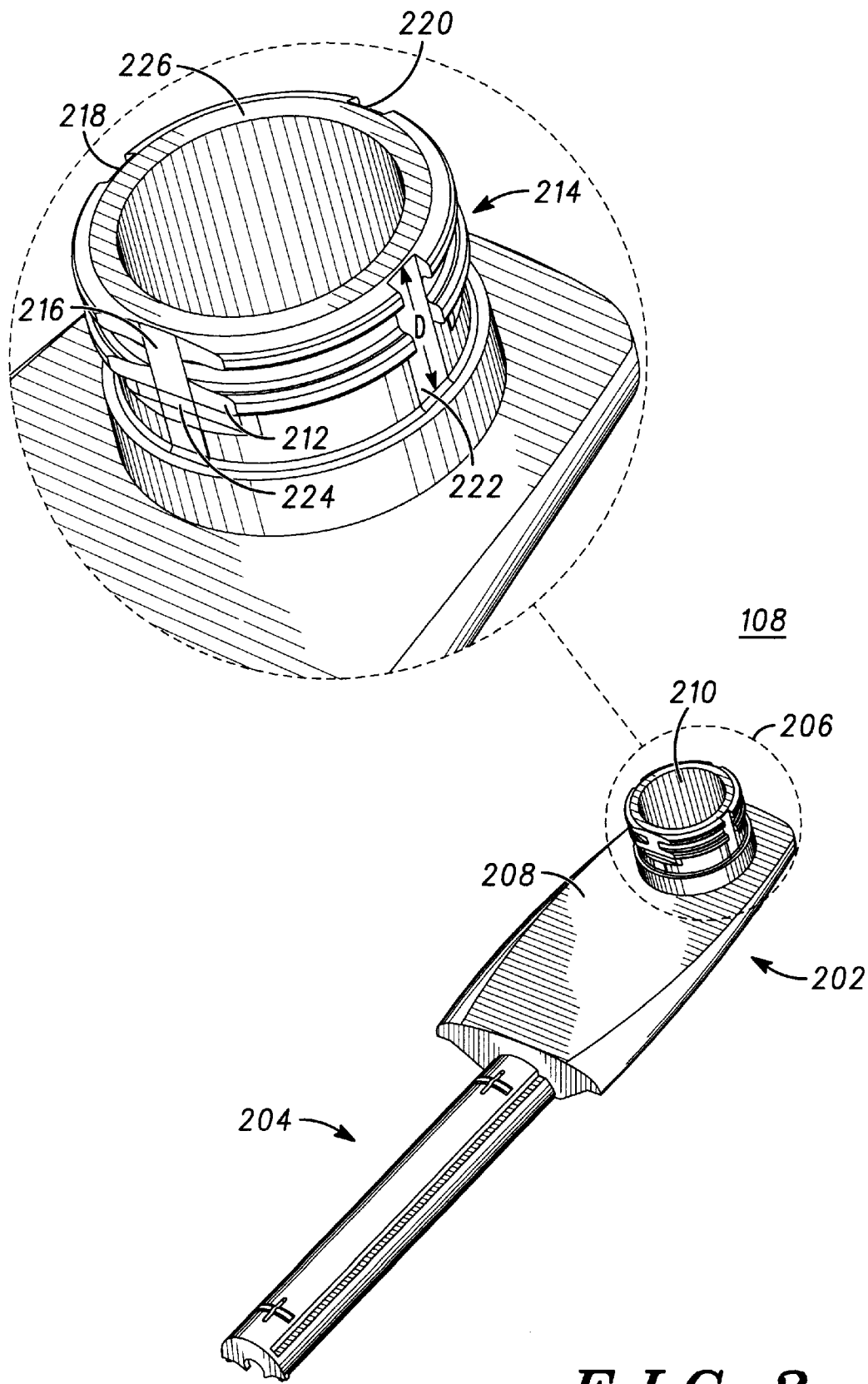
FIG. 2 is a front, bottom and right side perspective view of the antenna stem shown in FIG. 1.
Figure 3:
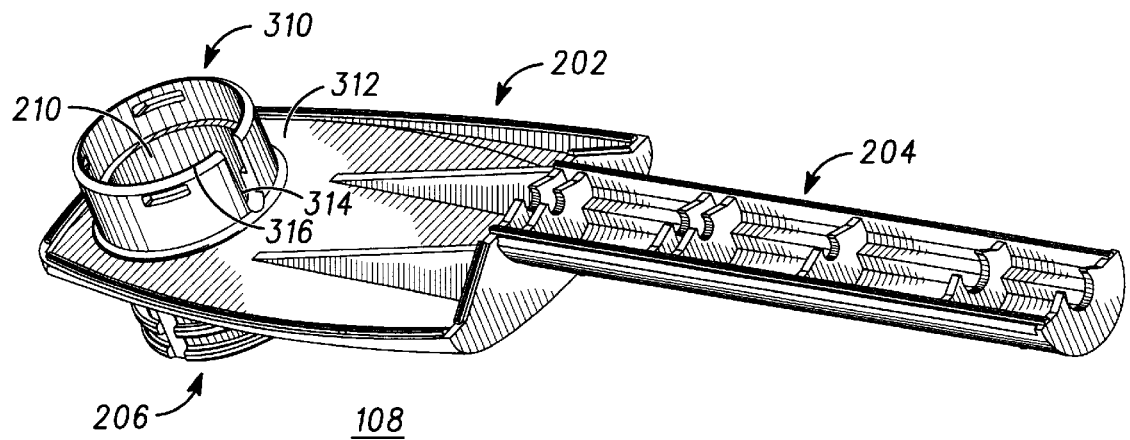
FIG. 3 is a rear, bottom and right side perspective view of the antenna stem shown in FIG. 1.
Figure 4:
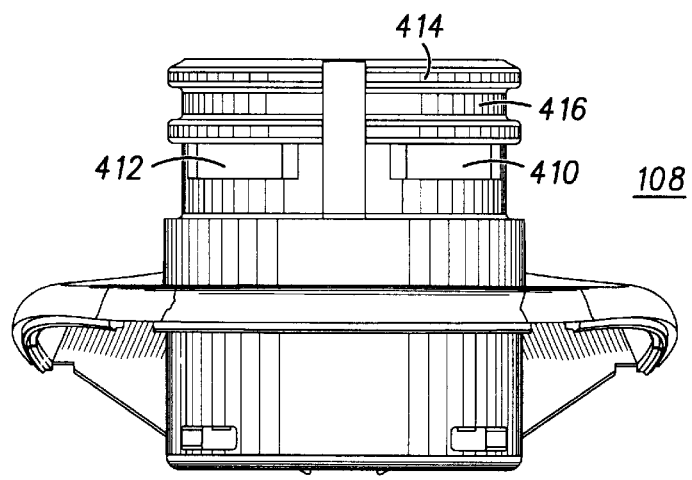
FIG. 4 is a top elevational view of the antenna stem shown in FIG. 1.

FIGS. 2–4 show several views of the antenna stem 108 of FIG. 1. FIG. 2 shows a front, bottom and right side perspective view of the antenna stem 108; FIG. 3 shows a rear, bottom and left side perspective view of the antenna stem 108; and FIG. 4 shows a top elevational view of the antenna stem 108. In the preferred embodiment, the antenna stem 108 is preferably injection molded using polycarbonate and includes a base 202, a leg 204 coupled to the base 202, a first raised wall 206 coupled to a top side 208 of the base 202 and a second raised wall 310 (FIG. 3) coupled to a bottom side 312 of the base 202. Extending through both the first raised wall 206 and the second raised wall 310 is an opening 210 for receiving the antenna connector 110 (described in detail later herein). The first raised wall 206 is generally cylindrical having a flat "I" shaped area 212 disposed on the outer surface 214 of the wall 206. The first raised wall 206 includes a plurality of key receptacles, preferably four, equally spaced along the outer surface 214 of the wall 206. Specifically, a first key receptacle 216 (shown partially in dotted lines) is centered in the flat "I" shaped area 212 along the outer surface 214 of the wall 206; a second key receptacle 218 is disposed on the outer surface 214 of the wall 206 and centered around a point 90° from the center of the first key receptacle 216; a third key receptacle 220 is disposed on the outer surface 214 of the wall 206 and centered around a point 90° from the center of the second key receptacle 218; and a fourth key receptacle 222 is disposed on the outer surface 214 of the wall 206 and centered around a point 900 from the center of the third key receptacle 220. Preferably, the key receptacles 216, 218, 220, 222 extend a depth D of the raised wall 206.

The outer surface 214 of the first raised wall 206 further defines a plurality of detents, preferably three. A first detent 224 is disposed along the outer surface 214 of the first raised wall 206 adjacent to the flat "I" shaped area 212; a second detent 410 (FIG. 4) is disposed along the outer surface 214 of the first raised wall 206 and centered around a point 135° from the center of the first detent 224; and a third detent 412 is disposed along the outer surface 214 of the first raised wall 206 and centered around a point 90° from the center of the second detent 410 (FIG. 4). The outer surface 214 of the first raised wall 206 also defines a plurality of pairs of lips 414, preferably four pairs, each pair of lips 414 creating a corresponding groove 416 between the two lips 414.

Figure 5:
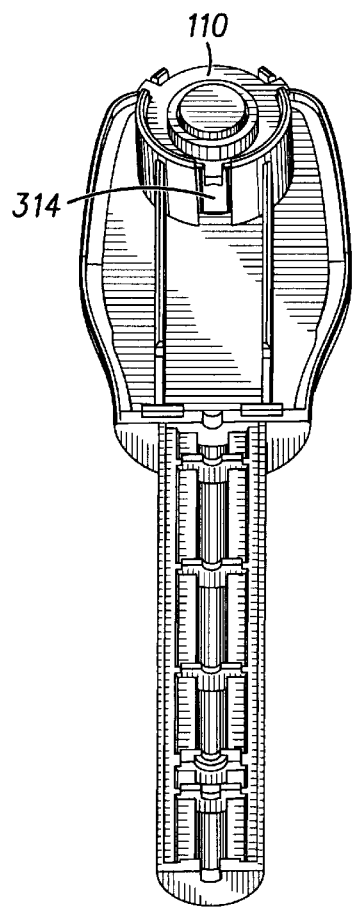
FIG. 5 is a rear view of the antenna stem shown in FIG. 1 with an antenna connector disposed therein.

The second raised wall 310 (FIG. 3) of the antenna stem 108 extends beneath the base 202 and has a substantially smooth cylindrical surface. The second raised wall 310 includes a slot 314 that extends from the base 202 of the antenna stem 108 to an outer edge 316 of the second raised wall 310. As shown in FIG. 5, the slot 314 receives a portion of the antenna connector 110 when the antenna connector 110 is disposed in the opening 210.

Figure 6:
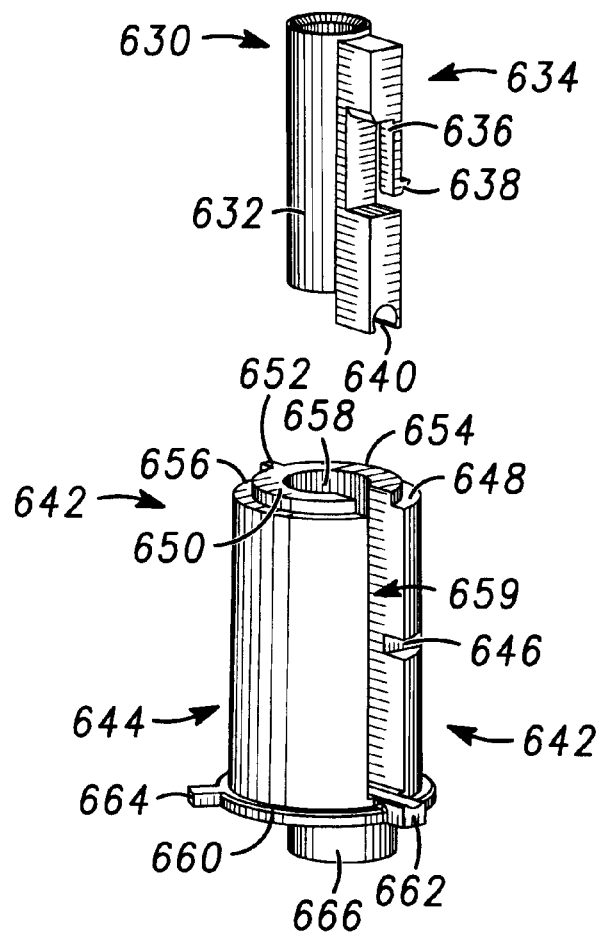
FIG. 6 is an exploded view of the antenna connector shown in FIG. 5.

Referring to FIG. 6, an exploded view of the antenna connector 110 is shown. The antenna connector 110 includes a center conductor 610, a dielectric 630 and an outer conductor 642. The center conductor 610 is preferably comprised of brass and includes a cylindrical head 612; a tubular neck 614 coupled to the head 612; a circular collar 616 coupled to the neck 614; and a body 618 having an upper portion 620 and a lower portion 622. A vertically-extending aperture (not shown) is formed through the collar 616 and at least partially through the body 618. A spring (not shown) is disposed in the aperture so that when pressure is applied to the top of the head 612, the neck 614 compresses the spring when it moves down into the aperture. This feature of the center conductor 610 allows the antenna connector 110 to maintain a robust coupling to the handset connector 104 (described below) when the antenna 106 is coupled to the handset 100.

The upper portion 620 of the center conductor body 618 is preferably beveled on one end 624 and includes a barbed region 626 at an opposite end. The lower portion 622 of the center conductor body 618 forms a rectangular shaped transversely extending aperture 628 for soldering to a center conductor of a coaxial cable (not shown).

The dielectric 630 is preferably injection molded using Ultem 2300 and includes a generally cylindrical portion 632 coupled to a substantially rectangular portion 634. The rectangular portion 634 includes an arm 636 forming a tab 638 at a bottom end thereof. The tab 638 is coupled to the outer conductor 642 (described below) during assembly of the antenna connector 110. Formed at the bottom end of the rectangular portion 634 is a transversely-extending arch 640 for allowing passage of the coaxial cable to the center conductor 610.

The outer conductor 642 is preferably injection molded using LCP plastic. The outer conductor 642 includes a cylindrical body 644 having an inner diameter and an outer diameter. Formed on an outer surface of the body 644 and extending into the body 644 is a slit 646 for receiving the tab 638 of the dielectric 630 during assembly of the antenna connector 110. Disposed at a top end 648 of the body 644 is a ring 650 having an outer diameter less than the outer diameter of the body 644. The ring 650 forms a finger 652 that extends from an outer surface 654 of the ring 650 to an outer surface 656 of the body 644. Formed about a central axis of the ring 650 and body 644 is a cavity 658 that extends from the top surface of the ring 650 through to the bottom surface of the body 644. Adjacent the cavity 658 is a slot 659 which extends from the top surface of the ring 650 to the bottom surface of the body 644. Disposed at a bottom end of the body 644 is a disc 660 having a diameter greater than the outer diameter of the body 644. Formed on the disc 660 and extending into the slot 659 is a trough 662 for receiving the coaxial cable (not shown) and soldering the outer jacket of the cable thereto. Also formed on the disc 660 is a plurality of locating tabs 664 (only one shown) for stabilizing the antenna connector 110 inside the first and second raised walls 206, 310 of the antenna stem 108. Coupled to a bottom side of the disc 660 is a spring guide 666 for maintaining a second spring (not shown). The second spring is used to help maintain a robust connection between the antenna connector 110 and handset connector 104 when the SSU antenna 106 is coupled to the handset 100.

During assembly of the antenna connector 110, the center conductor 610 is preferably press fitted into the dielectric 630 according to a specified interference fit. The dielectric 630, with center conductor 610 therein, is then disposed in the center conductor's cavity 658. The tab 638 formed at the end of the arm 636 of the dielectric 630 fits into the slit 646 formed on the outer conductor 642 to maintain the positioning of the dielectric 630 (and center conductor 610) in the cavity 658. The antenna connector 110 is coupled to circuitry (not shown) in the antenna 106 according to principles known in the art.

Figure 7:
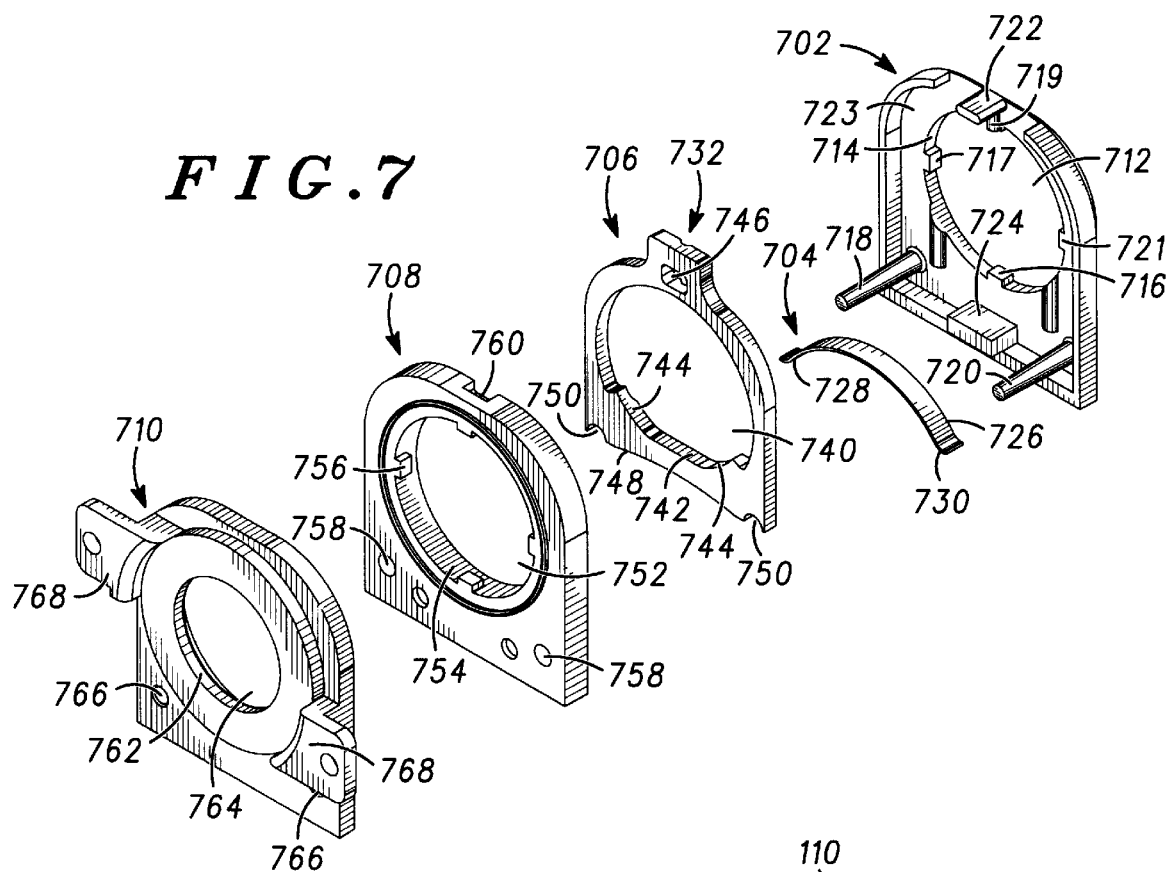
FIG. 7 is an exploded view of the antenna latch detent mechanism shown in FIG. 1.

FIG. 7 shows an exploded view of the antenna latch detent mechanism 102 (hereinafter "mechanism") that can be used in the present invention. The mechanism 102 includes a top plate 702; a plurality of leaf springs 704, preferably two (only one shown); a latch member 706; a middle plate 708 and a bottom plate 710. Preferably, the top plate 702, middle plate 708 and bottom plate 710 are comprised of polycarbonate; the leaf springs 704 are comprised of stainless steel and the latch member 706 is comprised of aluminum.

The top plate 702 is preferably arch-shaped and defines a first cylindrical hole 712 having a diameter slightly greater than the diameter of the first raised wall 206 of the antenna stem 108 for receiving the wall 206. Disposed on an interior surface 714 of the top plate 702 is a plurality of keys 716, 717, 710, 721, preferably four. The spacing of the keys 716, 717, 719, 721 on the interior surface 714 is such that the keys are received in the key receptacles 216, 218, 220, 222 (FIG. 2) of the antenna stem 108 when the stem mates with the mechanism 102. Specifically, a first key 716 is centered at the bottom of the interior surface 714; a second key 717 is centered around a point on the interior surface 90° from the center of the first key 716, a third key 719 is centered around a point on the interior surface 90° from the center of the second key 717; and fourth key 721 is centered around a point on the interior surface 90° from the center of the third key 719. The top plate 702 also includes a first post 718, a second post 720, a tab 722 and a rectangular block 724 disposed on the inner surface 723 of the top plate 702.

During assembly of the mechanism 102, the plurality of leaf springs 704 are coupled on one side 726 to a bottom portion of the inner surface 723 of the top plate 702. One end 728 of the leaf springs 704 is disposed under the first post 718 and the other end 730 is disposed under the second post 720, leaving the middle portion of the springs 704 situated above the rectangular block 724 (See FIG. 8).

Figure 8:
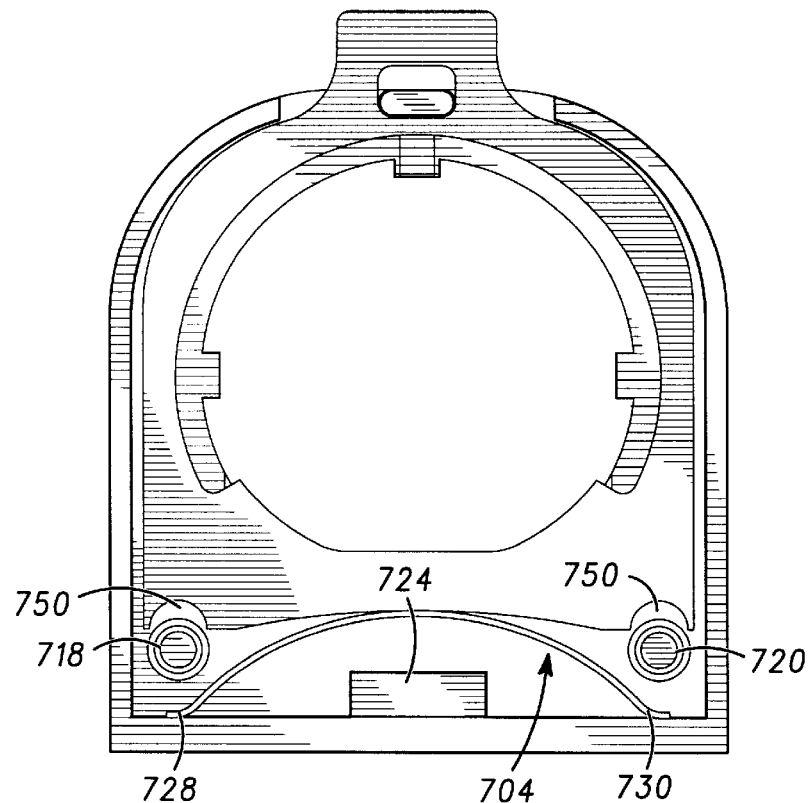
FIG. 8 is a rear view of the top plate of the mechanism of FIG. 7 with a leaf spring and a latch member coupled thereto.

The latch member 706 is generally arch shaped having a rectangular portion 732 at the top, and defines a second cylindrical hole 740. The hole 740 is such that the member 706 defines a flat portion 742 and two curved portions 744 about the hole 740. Located adjacent the second cylindrical hole 740 is an opening 746 for receiving the tab 722 of the top plate 702 when the latch member 706 is coupled to the inner surface 723 thereof. The bottom surface 748 of the latch member 706 is slightly curved having an arch shaped aperture 750 at both ends of the surface 748. The slightly curved bottom surface 748 of the latch member 706 mates with the top of the leaf springs 704 when the latch member 706 is coupled to the top plate 702. At the same time, the arch shaped apertures 750 are suspended above the posts 718, 720 of the top plate 702 as shown in FIG. 8.

The middle plate 708 is preferably arch-shaped and defines a third cylindrical hole 752 having a diameter slightly greater than the first raised wall 206 of the antenna stem 108 for receiving the wall 206. Disposed on an interior surface 754 of the middle plate 708 is a plurality of keys 756, preferably four. The spacing of the keys 756 on the interior surface 754 of the middle plate 708 is the same as the spacing of the keys 716, 717, 719, 721 on the top plate 702. The middle plate 708 also includes two apertures 758 and a rectangular notch 760. The two apertures 758 are for receiving the posts 718, 720 disposed on the inner surface 723 of the top plate 702. The notch 760 is for receiving the tab 722 disposed on the inner surface 723 of the top plate 702.

The bottom plate 710 is preferably arch-shaped and defines a recess 762 having a diameter of the first and third cylindrical holes 712, 752 of the top and middle plates 702, 708, respectively. The front surface 226 (FIG. 2) of the first raised wall 206 is disposed in the recess when the antenna stem 108 is coupled to the mechanism 102. Formed in the recess 762 is a fourth cylindrical hole 764 through which the antenna connector 110 and the handset connector 104 mate when the antenna 106 is coupled to the handset 100. The bottom plate 710 also includes two apertures 766 for receiving the posts 718, 720 disposed on the inner surface 723 of the top plate 702, and includes a plurality of mounting tabs 768 for coupling the mechanism 102 to the handset housing.

Figure 10:
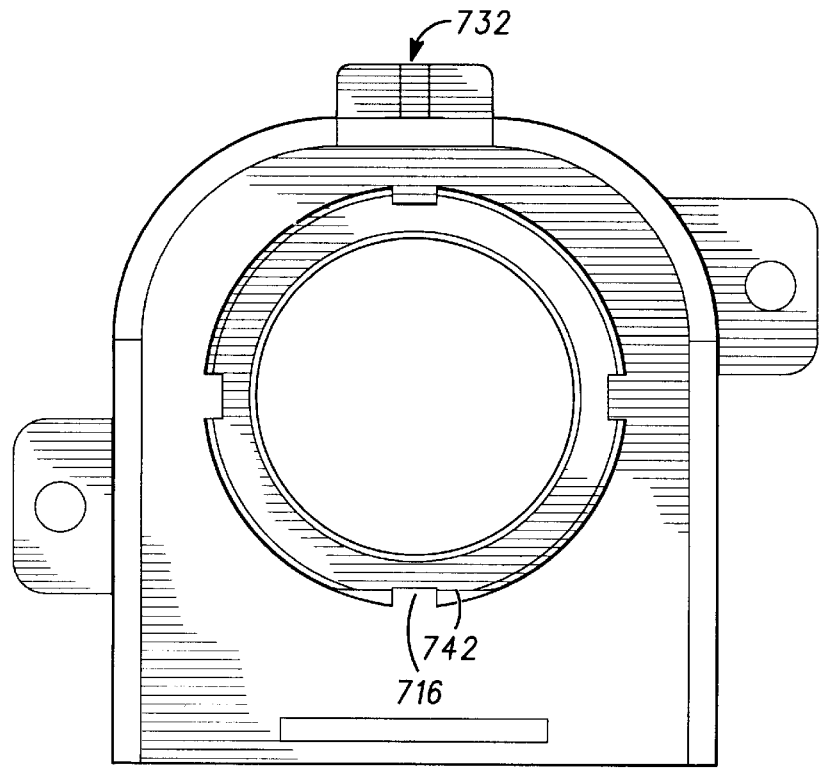
FIG. 10 is a front view of the assembled antenna latch detent mechanism of FIG. 7 with the latch member in an engaged position.
Figure 9:
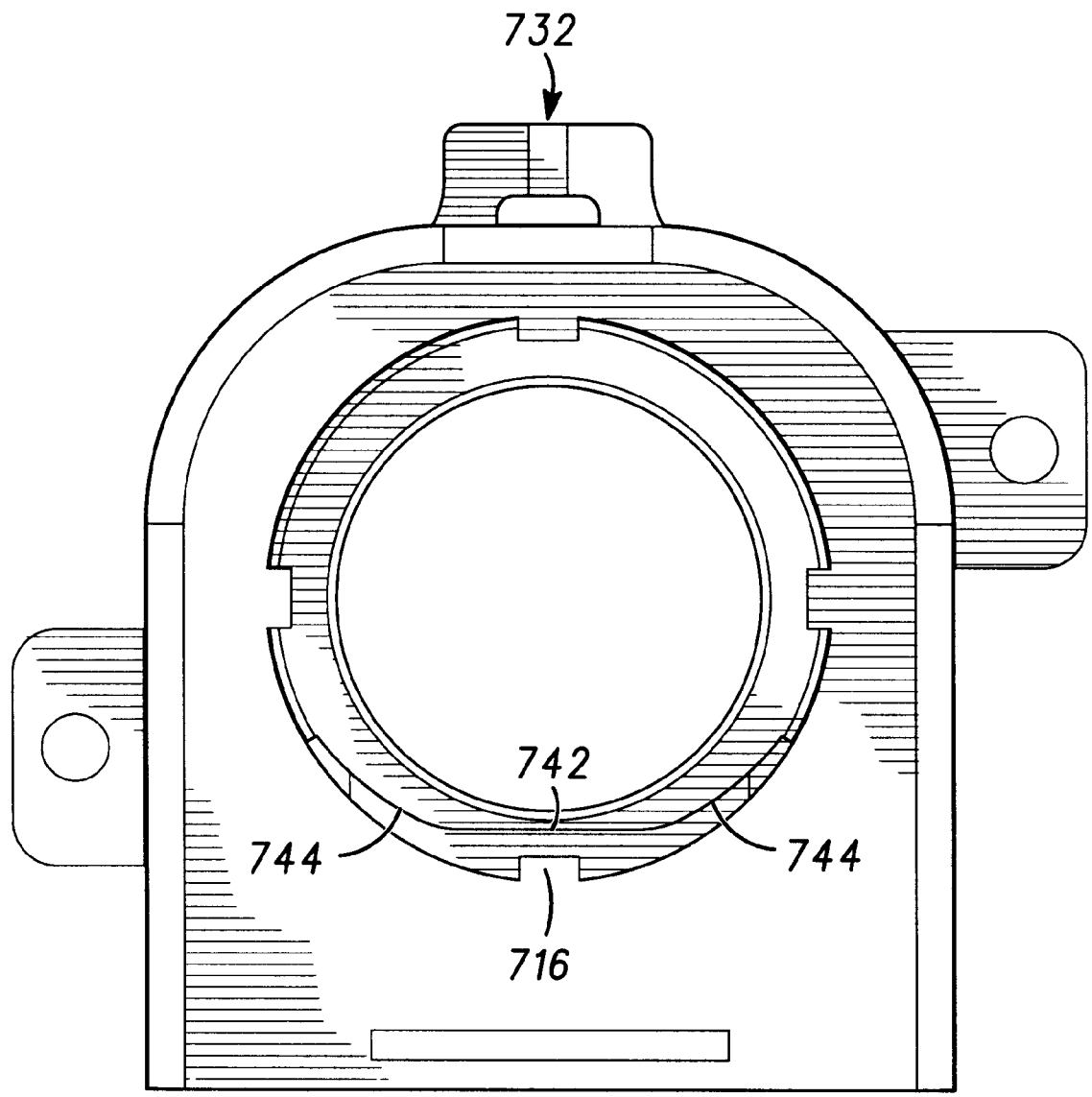
FIG. 9 is a front view of the assembled antenna latch detent mechanism of FIG. 7 with the latch member in a disengaged position.
Figure 12:
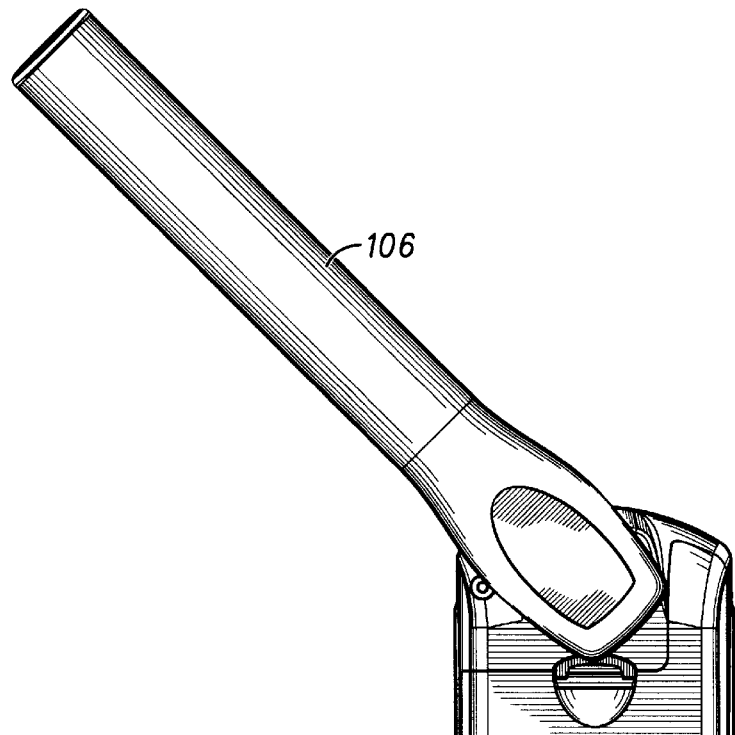
FIG. 12 is a rear view of the SSU with the antenna in a first deployed position.
Figure 13:
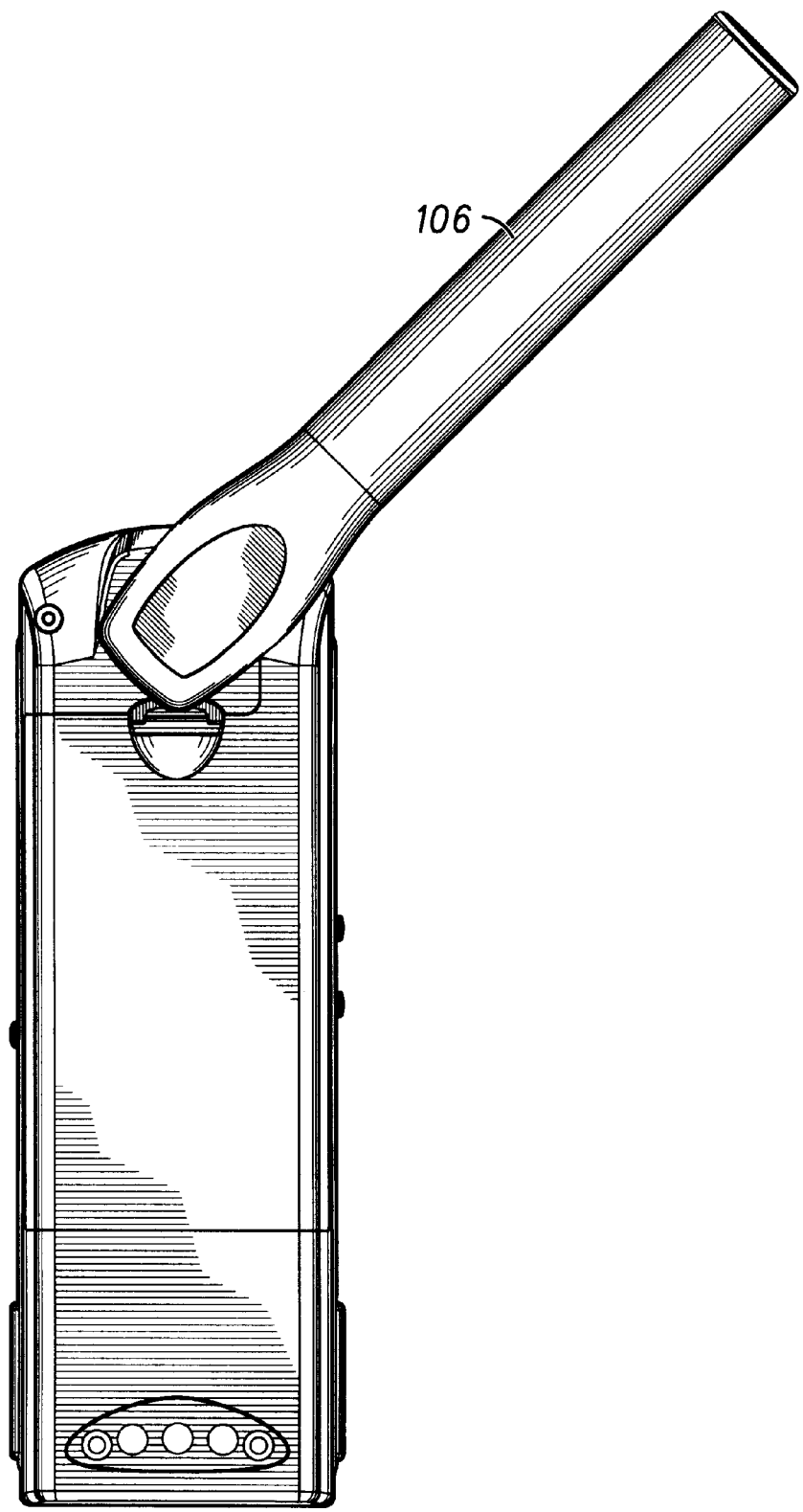
FIG. 13 is a rear view of the SSU with the antenna in a second deployed position.

When the latch detent mechanism 102 is fully assembled as shown in FIGS. 9 and 10, and coupled to the handset 100 as shown in FIG. 1, it is used in conjunction with the first raised wall 206 of the antenna stem 108 to maintain the antenna 106 in a stowed (or inactive) position (FIG. 11), a first deployed (or active) position (FIG. 12), or a second deployed position (FIG. 13).

FIG. 9 shows the mechanism 102 in a disengaged position (position when the antenna 106 is not coupled to the handset 100). When a user desires to couple the SSU antenna 106 to the handset 100, the mechanism 102 is engaged as follows. First the user presses a button 103 (FIG. 1) located on the top surface of the handset 100. This button 103 is coupled to the rectangular portion 732 of the latch member 706. Applying pressure to the rectangular portion 732 moves the latch member 706 downward until the two curved surfaces 744 of the member become aligned adjacent to the first cylindrical hole 712 of the top plate 702 and the flat portion 742 becomes aligned adjacent to the top of the first key 716 of the top plate 702, as shown in FIG. 10. This allows the mechanism 102 to receive the first raised wall 206 of the antenna stem 108 when the first raised wall 206 is oriented such that its key receptacles 216, 218, 220, 222 (FIG. 2) are aligned with the keys 716, 717, 719, 721, 756 (FIG. 7) of the mechanism 102. Once the first raised wall 206 is coupled to the mechanism 102, the user can let go of the button 103 on the handset 100 and the mechanism 102 will hold the antenna 106 in place.

Figure 11:
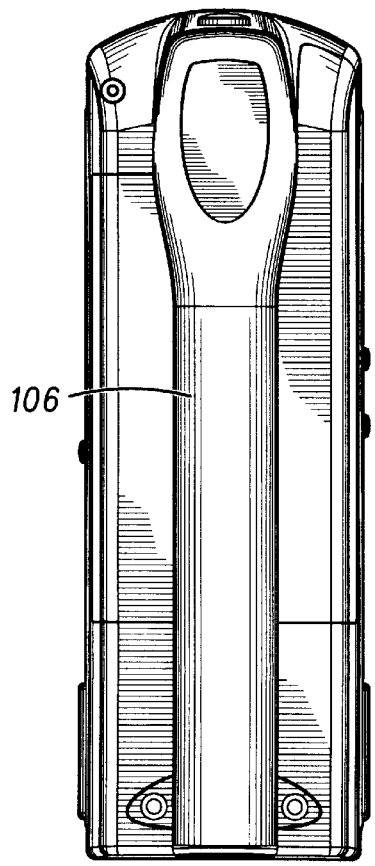
FIG. 11 is a rear view of the SSU with the antenna in a stowed position.

FIG. 11 shows the antenna 106 in a stowed (or inactive position). When the antenna 106 is in the stowed position, the flat portion 742 (FIG. 7) of the latch member 706 is received in the first detent 224 (FIG. 2) of the antenna stem's first raised wall 206. From the stowed position, the antenna 106 can be rotated in a clockwise direction to the first deployed position (FIG. 12). In this position, the flat portion 742 of the latch member 706 is received in the second detent 410 (FIG. 4) of the raised wall 206. The first deployed position would likely be used by a left-handed person holding the SSU to his or her left ear. Alternately, the antenna 106 can be rotated in a counterclockwise direction from the stowed position to the second deployed position (FIG. 13). In the second deployed position, the flat portion 742 of the latch member 706 is received in the third detent 412 of the antenna stem's raised wall 206. The second deployed position would likely be used by a right-handed person holding the SSU to his or her right ear.

Figure 14:
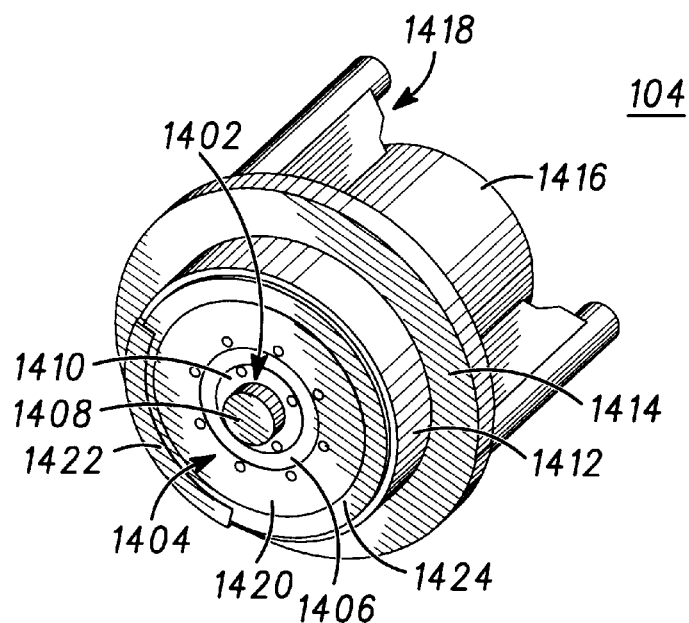
FIG. 14 is a front and right side perspective view of the handset connector.
Figure 15:
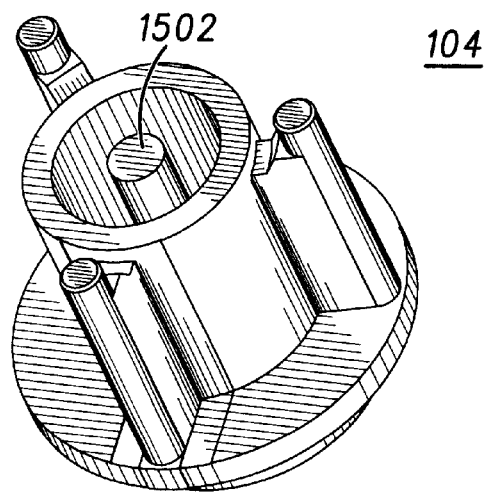
FIG. 15 is a rear and left side perspective view of the handset connector.

FIGS. 14 and 15 show the handset connector 104 which is disposed in the handset 100 and coupled to the antenna latch detent mechanism 102. The handset connector 104 is preferably injection molded using a plateable and a non-plateable plastic according to a process known in the art. The handset connector 104 includes a center conductor 1402 and an outer conductor 1404 in concentric relation to one another. The center conductor 1402 and outer conductor 1404 are separated by a circular non-conductive surface 1406. The center conductor 1402 includes a head 1408, a shoulder 1410 and a stem 1502 (FIG. 15). The outer conductor 1404 includes a first cylindrical portion 1412, a disc 1414 having a diameter greater than the first cylindrical portion 1412 and a second cylindrical portion 1416 having a diameter less than the first cylindrical portion 1412. A plurality of legs 1418 are coupled to the outer surface of the second cylindrical portion 1416 and the bottom side of the disc 1414.

The handset connector's outer conductor 1404 defines a conductive circle 1420 and a conductive arch 1422 separated by a non-conductive area 1424. When the SSU antenna 106 and handset 100 are coupled, the antenna connector's center conductor 610 (FIG. 6) mates with the handset connector's center conductor 1402, and the ring 650 of the antenna connector's outer conductor 642 mates with the conductive circle 1420 of the handset connector's outer conductor 1404. As the antenna 106 is rotated from the stowed position (FIG. 11) to a deployed position (FIGS. 12 and 13), the antenna connector 110 rotates with respect to the handset connector 104. In particular, the finger 652 of the antenna connector's outer conductor 642 travels along the non-conductive area 1424 of the handset connector's outer conductor 1404 until it reaches the conductive arch 1422. When the finger 652 is in the conductive arch 1422, the antenna 106 is in one of the two deployed positions and the SSU is allowed to transmit and receive signals.

The handset connector 104 is preferably coupled to the transceiver board (not shown) in the handset 100 in a manner known to one skilled in the art. As previously mentioned, the handset connector 104 includes a plurality of legs 1418 coupled to its outer conductor 1404. Preferably, one of the legs 1418 is an antenna sense leg capable of sensing when the antenna 106 is in one of the two deployed positions (described earlier herein) and notifying the circuitry (not shown) in the SSU. In response to this notification, the circuitry can allow the SSU to transmit and receive signals. Likewise, the antenna sense leg senses when the antenna 106 is not in one of the deployed positions (corresponding to when the antenna connector's finger 652 is not in the handset connector's conductive arch 1422) and notifies the SSU circuitry accordingly. In response, the SSU circuitry can prevent the SSU from transmitting or receiving signals.

The antenna coupling system of the present invention provides a robust RF connection between the antenna connector 110 and the handset connector 104 and allows the SSU to transmit and receive signals only when the antenna 106 is in the appropriate deployed positions. The antenna coupling system also provides a mechanism 102 whereby the antenna 106 is maintained in a vertical orientation with respect to the ground throughout a call regardless of whether the user is holding the SSU with his or her right hand.

Those skilled in the art will recognize that various modifications and variations can be made in the apparatus of the present invention and in construction of this apparatus without departing from the scope or spirit of this invention. For example, a printed circuit board with the conductive and non-conductive patterns of the handset connector's top surface can be substituted for the handset connector and used to provide a robust connection to the antenna conductor.

What is claimed is:

1. An antenna coupling system having an antenna stem comprising with a base and a raised wall having a bore therethrough, the raised wall coupled to the base and having an inner surface and an outer surface wherein the outer surface defines a plurality of key receptacles and a plurality of detents, the raised wall further mating with an antenna latch detent comprising:

a top plate defining a first cylindrical hole therethrough and having a plurality of keys disposed on a surface defining the hole, the top plate having an inner surface from which a tab, two posts and a rectangular block extend;

at least one leaf spring coupled to the inner surface of the top plate, the at least one leaf spring having a first end disposed under one of the posts and a second end disposed under the other of the posts, wherein a middle portion of the at least one leaf spring is disposed over the rectangular block;

a latch member coupled to the inner surface of the top plate, the latch member having an opening in a top portion for receiving the tab when the latch member is coupled to the top plate and having a second cylindrical hole having a substantially flat bottom to mate with the middle portion of the leaf spring;

a middle plate coupled to the top plate, the middle plate defining a third cylindrical hole therethrough and having a plurality of keys disposed on a surface defining the hole, the middle plate further having a notch for receiving the tab and two holes for receiving the posts; and a bottom plate coupled to the middle plate, the bottom plate having two holes for receiving the posts and having a recess for receiving a front surface of the raised wall, the recess defining an aperture.

2. An antenna latch detent mechanism comprising:

a top plate defining a first cylindrical hole therethrough and having a plurality of keys disposed on a surface defining the hole, the top plate having an inner surface from which a tab, two posts and a rectangular block extend;

at least one leaf spring coupled to the inner surface of the top plate, the at least one leaf spring having a first end disposed under one of the posts and a second end disposed under the other of the posts, wherein a middle portion of the at least one leaf spring is disposed over the rectangular block;

a latch member coupled to the inner surface of the top plate, the latch member having an opening in a top portion for receiving the tab when the latch member is coupled to the top plate and having a second cylindrical hole having a substantially flat bottom to mate with the middle portion of the leaf spring;

a middle plate coupled to the top plate, the middle plate defining a third cylindrical hole therethrough and having a plurality of keys disposed on a surface defining the hole, the middle plate further having a notch for receiving the tab and two holes for receiving the posts; and a bottom plate coupled to the middle plate, the bottom plate having two holes for receiving the posts and having a recess for receiving a front surface of the raised wall, the recess defining an aperture.

* * * * *